United States Patent [19]

Lehmann et al.

[11] 3,860,541

[45] Jan. 14, 1975

[54] STORAGE-STABLE, RAPIDLY CURABLE EPOXIDE RESIN COMPOSITION

[75] Inventors: Hans Lehmann, Birsfelden; Peter Wehrli, Mohlin; Bruno Schreiber, Basel, all of Switzerland

[73] Assignee: Ciba-Geigy Corporation, Ardsley, N.Y.

[22] Filed: Dec. 21, 1972

[21] Appl. No.: 317,466

[30] Foreign Application Priority Data

Dec. 24, 1971 Switzerland.................. 18912/71

[52] U.S. Cl........ 260/18 PN, 117/161 ZB, 161/185, 260/18 EP, 260/47 EN, 260/830 P, 260/830 TW
[51] Int. Cl. .................... C08g 45/12, C08g 45/14, C08g 47/100
[58] Field of Search ........ 260/18 EP, 18 PN, 830 P, 260/830 TW, 47 EN; 161/185; 117/161 ZB

[56] References Cited
UNITED STATES PATENTS

| 3,454,421 | 7/1969 | Westbrook | 260/47 |
| 3,625,918 | 12/1971 | Heer et al. | 260/47 |
| 3,651,098 | 3/1972 | Heer et al. | 260/2 |
| 3,655,817 | 4/1972 | Lohse et al. | 260/835 |
| 3,673,558 | 6/1972 | Toepel et al. | 260/47 |
| 3,676,200 | 7/1972 | Rembold et al. | 117/161 |

*Primary Examiner*—Melvyn I. Marquis
*Assistant Examiner*—Eugene C. Rzucidlo

[57] ABSTRACT

The storable, rapidly curable epoxide resin compositions contain a solid, cyclic polyglycidyl compound, an adduct, containing amino groups, of an epoxide resin and an aromatic or cycloaliphatic amine and a liquid polyamine. The epoxide resin compositions are manufactured by firstly manufacturing a hardener by reacting an aromatic or cycloaliphatic amine with epoxide resins and mixing the resulting adduct with a liquid polyamine, and mixing the so obtained hardener with a solid polyglycidyl compound in such a quantitative ratio that the number of epoxide groups to the number of active H-atoms is 1:1.

32 Claims, No Drawings

STORAGE-STABLE, RAPIDLY CURABLE EPOXIDE RESIN COMPOSITION

The invention relates to storage-stable, rapidly curable epoxide resin compositions which contain a cyclic polyglycidyl compound which is solid at room temperature, an adduct, possessing free amino groups, of an epoxide resin and an aromatic or cycloaliphatic amine, and a polyamine which is liquid at room temperature.

One-component epoxide resins of good storage stability are already known. Such know systems consist of the actual epoxide resin based on bisphenol A or other bisphenols or polyphenols and dicyandiamide which act as the curing agent. This one-component resin is predominantly used as a powder. It suffers from the disadvantage that at temperatures below 100°C curing is no longer possible. Appropriately, curing is carried out at temperature above 130°C. Curing at temperatures between 100° and 130°C, which industrially in itself is particularly interesting, requires excessively long curing times.

If instead of dicyandiamide aromatic or cycloaliphatic amines are incorporated, in solution or in the melt, into the above epoxide resins, one-component epoxide resins are obtained which, whilst showing the advantage of rapid curing even at lower temperatures, at the same time possess unsatisfactory storage stability.

Physical mixtures of epoxide resins and aromatic amines or aromatic and cycloaliphatic amine adducts, the storage stability of which can be described as adequate, are also known. Such systems are used, for example, in powder coating, especially in the fluidised bed process. On the other hand, they are unsuitable for use as adhesives for solid materials, especially for metals. Here again short curing times, which are frequently required in industry, lead to inadequate adhesive strength at temperatures below 130°C.

Surprisingly, the new epoxide resin compositions according to the invention do not suffer from the disadvantages of the known compositions. In fact, they are just as storage-stable as the known epoxide resin compositions or in part even superior to the latter in this respect. Additionally, the epoxide resin compositions according to the invention fulfil the second requirement of this special resin technique, namely that they cure rapidly at relatively low temperatures of about 80° to 130°C.

The subject of the invention is a storage-stable, rapidly curable, solid epoxide resin composition which contains (a) a cyclic polyglycidyl compound having a softening point of between 40° and 140°C, (b) an adduct, possessing free amino groups, of an epoxide resin and an aromatic or cycloaliphatic amine and (c) a liquid polyamine. Component (b) may consist also of a mixture of such adducts.

The cyclic polyglycidyl compound (a) can be a bisphenol-A epoxide resin, a glycidylated phenol or cresol novolac or an adduct, containing more than one epoxide group per molecule, of a liquid bisphenol-A resin or triglycidylisocyanurate and an acid polyester of an aliphatic dicarboxylic acid and an aliphatic diol, in which the sum of the C atoms of the diol and of the C atoms of the dicarboxylic acid, without taking the carboxyl groups into account, is at least 8. Further possible cyclic polyglycidyl compounds (a) are mixtures of a bisphenol-A epoxide resin or a glycidylated phenol or cresol novolac with an adduct, containing more than one epoxide group per molecule, of a liquid bisphenol-A epoxide resin, triglycidylisocyanurate or diglycidyltetrahydro- or -hexahydrobenzimidazolone and an acid polyester of an aliphatic dicarboxylic acid and an aliphatic diol, with the polyester having to fulfil the condition already mentioned as regards its structure.

If the cyclic polyglycidyl compound (a) contains, or is, an adduct, containing more than one epoxide group per molecule, based on triglycidylisocyanurate, as has already been described, an adduct which contains 4 epoxide groups per molecule is preferably used. In principle, it is also possible to use corresponding adduct mixtures which preferably contain an excess of the adduct last described, which possesses 4 epoxide groups per molecule.

The adduct (b), possessing free amino groups, of the epoxide resin composition according to the invention for example contains, as the amine, a 4,4'-diaminodiphenyl- or 4,4'-diaminodicyclohexyl-alkane, preferably in a particular methane derivative. Furthermore, this adduct (b) is preferably based on an epoxide resin which is either a reaction product of an ester of sebacic acid and 3-(2'-hydroxyethyl)-5,5-dimethylhydantoin in the molar ratio of 1:2 and epichlorohydrin, or a bisphenol-A epoxide resin. The adduct (b) can however also be based on a diglycidyltetrahydro- or -hexahydrobenzimidazolone.

As the liquid polyamine (c), the epoxide resin composition according to the invention preferably contains polyaminoamides of dimerised fatty acids which are commercially available, for example under the name "Versamid", or triethylenetetramine.

A further subject of this invention is a process for the manufacture of storage-stable, rapidly curable solid epoxide resin compositions which is characterised in that α) a curing agent is manufactured by reacting an aromatic or cycloaliphatic amine in excess with an epoxide resin at 80° to 200°C and mixing the adduct obtained, in the melt, with a liquid polyamine in the weight ratio of about 100 to 5–50, and β) the curing agent thus obtained is mixed with a cyclic polyglycidyl compound having a softening point of between 40° and 140°C, in a ratio of the quantities such that the ratio of the number of epoxide groups to the number of active H atoms in the curing agent is 1:1.

Possible starting substances for the manufacturing process according to the invention are all the substances which have already been mentioned in discussing the products according to the invention.

The curing agents employed in the manufacturing process according to the invention have softening points of above 40°C and can therefore be ground readily. This again presupposes that the adduct (β) present as the main constituent in the curing agent do not soften below 60°C.

The adduct, containing more than one epoxide group per molecule, which may be employed as the cyclic polyglycidyl compound in the manufacturing process according to the invention is preferably based on an acid polyester which has a degree of polymerisation of 3 to 20, preferably 5 to 12. By an acid polyester there is here to be understood a polyester with two terminal carboxyl groups. A preferred form of the adducts employed is based on an acid polyester of sebacic acid and neopentyl glycol.

In the process according to the invention, the curing agent and the cyclic polyglycidyl compound are mixed, for example, by conjointly grinding the two individual components which are already present in the form of a powder. The powders can have been manufactured by a preliminary grinding of the individual components or also in some other way. The powder mixture is appropriately ground by means of a ball mill.

In principle, the mixture according to the invention can also be produced by grinding coarse particles of the individual components.

Through the process according to the invention, the epoxide resin compositions are obtained in the form of largely uniform powders. However, a large proportion of these powders consists of individual particles which are colloidally to coarsely dispersed 2-phase mixtures of the curing agent and the cyclic polyglycidyl compound.

The epoxide resin compositions according to the invention are however not necessarily in the form of powders but can also be manufactured in the form of granules. For example, a very coarse-grained material can also be manufactured from the pulverulent material, by known processes of so-called "build-up granulation". Additionally, a different further processing of the powder by tabletting in accordance with known process is also possible, which yields very uniform articles.

The main use of the epoxide resin compositions according to the invention lies in the field of adhesives, preferably in the construction of skis. For this, predominantly pulverulent, but also granular, compositions are employed.

It has also proved desirable, when making glue bonds to use fibre fleeces, woven fabrics, sheets or films of plastics, glass or the like, coated with the compositions according to the invention, as an intermediate layer between the surfaces being glued. In the case of ski construction, for example, this leads to an elastic reinforcement of the laminate.

In the manufacture of such fibre fleeces or the like, coated with the compositions according to the invention, the starting substrates are preferably modified beforehand by means of a primer. Possible primers are, for example, thermoplastics with softening points of 150° to 200°C, preferably thermoplastic epoxide resin of the phenoxy type. They are applied in solution to the substrate. The epoxide resin composition according to the invention is sprinkled in powder form onto the substrate which is still moist, and thereafter the material is dried.

Equally, liquid bisphenol A resins which contain polyamines (for example Versamids) as curing agents and which crosslink at room temperature are suitable for use as primers. If such resin systems are mobile, they can be used undiluted as the primer; otherwise, they are employed in solutions. In this case, again, the moist substrate provided with the primer is sprinkled with the pulverulent epoxide resin composition according to the invention. After drying the article and curing the primer, the excess non-adhering powder is removed.

In many cases, the use of a primer is also superfluous. In such cases, the pulverulent powder according to the invention is pressed on cold.

In principle, the epoxide resin compositions according to the invention can also be employed as compression moulding compositions or for powder coating, preferably for the fluidised bed process.

EXAMPLE 1

A. Manufacture of the curing agent 29.1 g of 4,4-diaminodiphenylmethane are fused and mixed at 120°C with 41.8 g of liquid epoxide resin based on bisphenol A and epichlorohydrin having an epoxide content of 4.6 equivalent/kg, and the mixture is left to react. After the exothermic reaction has subsided, 29.1 g of a liquid polyaminoamide which is commercially available under the name Versamid 125, are added to the melt at 120°C and mixed in, and the whole is poured out in a thin layer and ground after cooling (softening point 62°C).

The polyaminoamide added is obtained by condensation of dimerised unsaturated fatty acids, predominantly linoleic acid, with triethylenetetramine. In addition to the amide groups, it also contains imidazoline groups and reactive amino groups.

B. Manufacture of the storage-stable, rapidly curable epoxide resin compositions 13.3 g of an adduct of 65 parts by weight of an acid polyester of sebacic acid and neopentyl glycol, having an acid equivalent weight of 1,300, and 35 parts by weight of triglycidylisocyanurate, having an epoxide equivalent weight of 110 (epoxide content of the adduct =2.42/kg) are added to 53.3 g of solid epoxide resin (epoxide content 0.9 equivalent/kg) based on bisphenol A and epichlorohydrin (softening point 105°C) and the whole is mixed with 33.4 g of lithopone, poured out as a thin layer, cooled and ground. The softening point of the mixed resin M thus obtained is about 60°C. 100 g of this resin are mixed with 20 g of the curing agent described under A. The powder mixture is ground in a ball mill for 8 hours at room temperature.

The single-component system thus obtained displays the following properties:

| | | |
|---|---|---|
| Softening point: | 60°C | (Kofler bench) |
| Gelling time at 120°C: | 35 seconds | (Kofler bench) |
| Tensile shear strength after curing at 120°C, 10 minutes: | 1.9–2.1 kp/mm² | (DIN 53,283) |
| After 8 months' storage at 23°C | | |
| Softening point: | 68°C | |
| Gelling time at 150°C: | 35 seconds | |
| Tensile shear strength after curing at 120°C, 10 minutes: | 1.9–2.1 kp/mm² | |

The numerical data in Table 1 clearly show the technical advance achieved by the invention, and its inventiveness. The epoxide resin combination according to the invention, of Example 1, is compared with systems according to the state of the art. Mixture "a" is based on a mixture of a solid epoxide resin based on bisphenol A and epichlorohydrin, having an epoxide content of 2.3 equivalent/kg, with dicyandiamide as the curing agent. Mixture "b" is based on the same epoxide resin but with 4,4'-diaminodiphenylmethane as the curing agent whilst "c" represents the single-component system according to the invention, analogously to Example 1.

The storage stability was determined by measuring the processability at 120°C for the manufacture of tensile shear test specimens, and by the corresponding tensile shear strength. The gelling time was determined by observing a drop of the material on the Kofler bench. The tensile strength was in each case determined on aluminium (Anticorodal B) sheets according to DIN 53,283.

TABLE 1

| Mixture | "a" | "b" | "c" |
|---|---|---|---|
| Storage stability at 20–25°C | >8 months | ~4 weeks | >8 months |
| Gelling time at 150°C | >1,000 seconds | 180 seconds | 35 seconds |
| Tensile shear strength after | | | |
| Curing for 60 minutes at 80°C | no curing | no curing | 50 kp/cm$^2$ |
| 15 minutes at 100°C | no curing | 10 kp/cm$^2$ | 70 kp/cm$^2$ |
| 15 minutes at 120°C | no curing | 50 kp/cm$^2$ | 200 kp/cm$^2$ |

EXAMPLE 2

A. Manufacture of the curing agent 39.8 g of epoxide resin based on bisphenol A and epichlorohydrin, having an epoxide content of 4.6 equivalent/kg, are mixed with 32.7 g of 4,4-diamino-3,3-dimethyldicyclohexylmethane at 120°C and allowed to react for 30 minutes. 27.5 g of Versamid 125 (polyaminoamide of Messrs Schering, Bergkamen) are now mixed in at 120°C and the whole is left to cool as a thin layer, and is ground.

B. Manufacture of the storage-stable, rapidly curable epoxide resin compositions 100 g of the pulverulent mixed resin M described in Example 1 under B and 22 g of the curing agent described in Example 2 under A are post-ground conjointly in a ball mill for 8 hours. The one-component system thus obtained shows the following properties:

| | |
|---|---|
| Softening point: | 60°C |
| Gelling time at 150°C: | 45 seconds |
| Tensile shear strength after curing at 120°C, 10 minutes: | 2.0–2.3 kp/mm$^2$ |

EXAMPLE 3

A. Manufacture of the curing agent 35 g of 4,4'-diaminodiphenylmethane are fused and mixed at 120°C with 50.4 g of a liquid epoxide resin based on bisphenol A and epichlorohydrin, having an epoxide content of 4.6 equivalent/kg, and left to react for 30 minutes. Thereafter 14.6 g of triethylenetetramine are mixed in and the whole is left to cool as a thin layer and is then ground.
Softening point: 45°C B. Manufacture of the storage-stable, rapidly curable epoxide resin compositions 7.5 g of the pulverulent curing agent manufactured in this way and 100 g of the pulverulent mixed resin M already mentioned in Examples 1 and 2 are post-ground conjointly in a ball mill for 8 hours. The resulting end product shows the following properties:

| | |
|---|---|
| Softening point: | 57°C |
| Gelling time at 150°C: | 30 seconds |
| Tensile shear strength after curing at 120°C, 10 minutes: | 1.2 kp/mm$^2$ |

EXAMPLE 4

A. Manufacture of the curing agent 24 g of 4,4'-diaminodiphenylmethane are fused and mixed at 120°C with 50 g of an epoxide resin of the N'N-diglycidylbis-hydantoin type manufactured by reaction of epichlorohydrin with an ester of 1 mol of sebacic acid and 2 mols of 3-(2'-hydroxyethyl)-5,5-dimethylhydantoin (epoxide content 3.0 equivalent/kg) and left to react for 30 minutes. 34 g of polyaminoamide (Versamid 125, Messrs Schering) are now mixed in and the whole is left to cool as a thin layer and is ground.
Softening point 43°C.

B. Manufacture of the storage-stable, rapidly curable epoxide resin composition 24 g of the curing agent manufacture in this way together with 100 g of the pulverulent mixed resin M are post-ground in a ball mill at room temperature for 8 hours. An epoxide resin composition having the following properties was obtained:

| | |
|---|---|
| Softening point: | 60°C |
| Gelling time at 150°C: | 50 seconds |
| Tensile shear strength after curing at 120°C, 10 minutes: | 1.8–2.0 kp/mm$^2$ |

EXAMPLE 5

Solid epoxide resin (epoxide content 0.9 equivalent/kg) based on bisphenol A and epichlorohydrin (melting point 105°C) is comminuted and ground for 4–6 hours by means of a ball mill. 22 g of the curing agent described under 1 A, which has also been finely ground, are added to 100 g of this epoxide resin powder and the whole is mixed for one hour in an end-over-end mixer.

The one-component system thus obtained shows the following properties:

| | | |
|---|---|---|
| Softening point: | 73°C | (Kofler bench) |
| Gelling time in a thin layer at 120°C: | 150 seconds | (Kofler bench) |
| Tensile shear strength after 10 minutes curing at 120°C: | 1.2–1.3 kp/mm$^2$ | (DIN 53,283) |

EXAMPLE 6

100 g of a solid glycidylated cresol novolac (epoxide content 4.3 equivalent/kg) having a softening point of 80°C are ground and mixed with 98 g of the ground curing agent described under Example 1 A. The powder mixture is good together at room temperature in a ball mill for 8 hours.

The one-component system thus obtained shows the following properties:

| | | |
|---|---|---|
| Softening point: | 60°C | (Kofler bench) |
| Gelling time in a thin layer at 120°C: | 90 seconds | (Kofler bench) |
| Tensile shear strength after 10 minutes curing at 120°C: | 0.8–1.2 kp/mm² | (DIN 53,283). |

EXAMPLE 7

13.3 g of an adduct of 100 parts by weight of an acid polyester of sebacic acid and neopentyl glycol, having an acid equivalent weight of 1,300, and 100 parts by weight of a liquid epoxide resin (epoxide content 5.2 equivalent/kg) from bisphenol A and epichlorohydrin (epoxide content of the adduct: 2.3 equivalent/kg) are added to 53.3 g of solid epoxide resin (epoxide content 0.9 equivalent/kg) based on bisphenol A and epichlorohydrin (softening point 105°C) and the whole is mixed at 130°C, poured out as a thin layer, cooled and ground. The softening point of the mixed resin thus produced is about 61°C. 100 g of this resin are mixed with 27 g of the curing agent described under Example 1 A. The powder mixture is ground at room temperature in a ball mill for 8 hours.

The one-component system thus obtained shows the following properties:

| | | |
|---|---|---|
| Softening point: | 60°C | (Kofler bench) |
| Gelling time in a thin layer at 120°C: | 120 seconds | (Kofler bench) |
| Tensile shear strength after 10 minutes curing at 120°C: | 1.7–1.9 kp/mm² | (DIN 53,283) |

EXAMPLE 8

13.3 g of an adduct of 65 parts by weight of an acid polyester from sebacic acid and neopentyl glycol, having an acid equivalent weight of 1,300, and 35 parts by weight of triglycidylisocyanurate having an epoxide equivalent weight of 110 (epoxide content of the adduct: 2.4 equivalent/kg) are added to 53.3 g of solid glycidylated cresol novolac (epoxide content 4.3 equivalent/kg) having a softening point of 80°C and the whole is mixed together at 130°C, poured out as a thin layer, cooled and ground. The softening point of the mixed resin thus obtained is about 58°C. 100 g of this resin are mixed with 91 g of the curing agent described under Example 1 A. The powder mixture is ground at room temperature in a ball mill for 8 hours.

The one-component system thus obtained shows the following properties:

| | | |
|---|---|---|
| Softening point: | 56°C | (Kofler bench) |
| Gelling time in a thin layer at 120°C: | 60 seconds | (Kofler bench) |
| Tensile shear strength after 10 minutes curing at 120°C: | 1.0–1.2 kp/mm² | (DIN 53,283) |

EXAMPLE 9

A. Manufacture of the curing agent 29.1 g of 4,4'-diaminodiphenylmethane are fused and mixed at 120°C with 20 g of liquid epoxide resin based on bisphenol A and epichlorohydrin, having an epoxide content of 4.6 equivalent/kg, and 53.1 g of an adduct of 202.9 g of an acid polyester of adipic acid and neopentyl glycol having an acid equivalent weight of 688, and 118 g of a glycidyl compound of the following structure

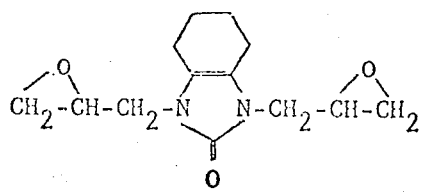

having an epoxide content of 7.55 equivalent/kg, and left to react. After the exothermic reaction has subsided, 29.1 g of a liquid polyaminoamide which is commercially available under the name Versamid 125 are added to the melt at 120°C and mixed in, and the whole is poured out as a thin layer, cooled and then ground in a ball mill for 4 hours. (Softening point: 45°C).

B. Manufacture of the storage-stable, rapidly curing epoxide resin composition 13.3 g of an adduct of 202.9 g of an acid polyester of adipic acid and neopentyl glycol, having an acid equivalent weight of 688, and 118 g of a glycidyl compound of the chemical formula indicated under Example 9 A, having an epoxide content of 7.55 equivalent/kg, are added to 53.3 g of solid epoxide resin (epoxide content 0.9 equivalent/kg) based on bisphenol A and epichlorohydrin (softening point 105°C) and mixed at 120°C, and the mixture is poured out as a thin layer, cooled and ground for 4 hours in a ball mill. The softening point of the mixed resin thus obtained is about 65°C. 100 g of this resin powder are mixed with 32 g of the curing agent described under 9 A in an end-over-end mixer for 4 hours, whereupon a one-component system with the following properties is obtained:

| | | |
|---|---|---|
| Softening point: | 57°C | (Kofler bench) |
| Gelling time in a thin layer at 120°C: | 90 seconds | (Kofler bench) |
| Tensile shear strength after 10 minutes curing at 120°C: | 1.4–1.7 kp/mm² | (DIN 53,283). |

EXAMPLE 10

A polyester fibre fleece weighing 25 g per m² is sprinkled at room temperature with an epoxide resin composition according to Example 1 and the whole is pressed together by means of a roller. An adhesive film A is produced.

In a further experiment, glass fabric, weighing 100 g/m², is dipped in a solution of 1 g of thermoplastic phenoxy-epoxide resin in a mixture of 30 g of cyclohexanol, 30 g of methyl glycol and 39 g of methyl ethyl ketone and the wetted fabric is sprinkled on both sides with epoxide resin powder according to Example 1. An adhesive film B comprising approx. 200 g of powder per m² is produced. Additionally, a nylon fabric (CEREX 5706, Monsanto) weighing 12.5 g per m² is impregnated with a carrier resin (30% strength solution of a liquid epoxide resin of bisphenol A and epichlorohydrin and the equivalent amount of triethylenetetramine in methylene chloride) and the solvent is evaporated by means of warm air. The fabric is now sprinkled on both sides with epoxide resin powder according to Example 1, and after the carrier resin has cured the resulting adhesive film C displays extremely good processing properties. Films and sheets of various materials such as metals, thermoplastics and the like can also be coated and glued in the same manner. The table which follows lists the achieved adhesive strengths of adhesive films A–C, measured on ground and degreased Anticorodal 100 B test specimens according to DIN 53,283, after curing for 10 minutes at 120°C.

| | |
|---|---|
| Adhesive film A | : 1.7 – 1.9 kp/mm² |
| Adhesive film B | : 1.9 – 2.1 kp/mm² |
| Adhesive film C | : 1.9 – 2.2 kp/mm² |

What we claim is:

1. A storage-stable, solid epoxide resin composition consisting essentially of:
   a. a cyclic polyglycidyl compound with a softening point of between 40° and 140°C;
   b. an adduct, possessing free amino groups having a softening point above 60°C, wherein said adduct is prepared by reacting a 1,2-epoxide resin with an excess of an aromatic or cycloaliphatic amine selected from the group consisting of a 4,4'-diaminodiphenylalkane and a 4,4'-diaminodicyclohexylalkane at a temperature of 80° to 200°C; and
   c. a liquid polyamine selected from the group consisting of triethylenetetramine and a polyaminoamide of dimerized fatty acids,
   wherein components (b) and (c) are present in a weight ratio of about 100 to 5.50 and the ratio of components (a) to (b) and (c) is such that the number of epoxide groups to the number of active hydrogen atoms is 1 to 1.

2. Epoxide resin composition according to claim 1, characterised in that the cyclic polyglycidyl compound (a) is a bisphenol A epoxide resin.

3. Epoxide resin composition according to claim 1, characterised in that the cyclic polyglycidyl compound (a) is a glycidylated phenol novolac or cresol novolac.

4. Epoxide resin compositions according to claim 1 characterized in that the cyclic polyglycidyl compound (a) is an adduct containing more than one epoxide group per molecule, said adduct is prepared by reacting a liquid bisphenol A epoxide resin or triglycidylisocyanurate with a terminal dicarboxylic acid polyester of an aliphatic dicarboxylic acid and an aliphatic diol, which has a degree of polymerization of 3 to 20, in which the sum of C atoms of the diol and the C atoms of the dicarboxylic acid, without taking the carboxyl groups into account, is at least 8.

5. Epoxide resin composition according to claim 4, characterised in that the adduct contains an acid polyester based on sebacic acid and neopentyl glycol.

6. Epoxide resin composition according to claim 4, characterised in that the cyclic polyglycidyl compound (a) is a mixture of adducts of triglycidylisocyanurate and an acid polyester of an aliphatic dicarboxylic acid and neopentyl glycol and this adduct mixture predominantly contains an adduct containing 4 epoxide groups per molecule.

7. Epoxide resin composition according to claim 1, characterized in that the cyclic polyglycidyl compound (a) is a mixture of a bisphenol A epoxide resin and an adduct, containing more than one epoxide group per molecule, said adduct is prepared by reacting a triglycidylisocyanurate, a bisphenol A epoxide resin or a diglycidyltetrahydrobenzimidazolone or -hexahydrobenzimidazolone with a terminal dicarboxylic acid polyester of an aliphatic dicarboxylic acid and an aliphatic diol, which has a degree of polymerization of 3 to 20, in which the sum of the C atoms of the diol and the C atoms of the dicarboxylic acid, without taking the carboxyl groups into account, is at least 8.

8. Epoxide resin composition according to claim 1, characterized in that the cyclic polyglycidyl compound (a) is a mixture of a glycidylated phenol novolac or cresol novolac and adduct, containing more than one epoxide group per molecule, said adduct is prepared by reacting a triglycidylisocyanurate with a terminal dicarboxylic acid polyester of an aliphatic dicarboxylic acid an aliphatic diol, which has a degree of polymerization of 3 to 20 in which the sum of the C atoms of the diol and the C atoms of the dicarboxylic acid, without taking the carboxyl groups into account, is at least 8.

9. Epoxide resin composition according to claim 1 characterised in that the adduct (b) contains 4,4'-diaminodiphenylmethane as the amine.

10. Epoxide resin composition according to claim 1, characterised in that the adduct (b) contains 4,4'-diaminodicyclohexylmethane as the amine.

11. Epoxide resin composition according to claim 1, characterised in that the liquid polyamine (c) is triethylenetetramine.

12. Epoxide resin composition according to claim 1, characterised in that the liquid polyamine (c) is a polyaminoamide of dimerised fatty acids.

13. Epoxide resin composition according to claim 1, characterised in that the adduct (b) is bsed on an epoxide resin which is a reaction product of an ester of sebacic acid and 3-(2'-hydroxyethyl)-5,5-dimethylhydantoin in the molar ratio of 1:2 and epichlorohydrin.

14. Epoxide resin composition according to claim 1, characterised in that the adduct (b) is based on a bisphenol-A epoxide resin.

15. A process for the manufacture of storage-stable, solid 1,2-epoxide resin compositions, characterised in that α) a curing agent is manufactured by reacting an aromatic or cycloaliphatic amine selected from the group consisting of a 4,4'-diaminodiphenylalkane and a 4,4'-diaminodicyclohexylalkane in excess with a 1,2-epoxide resin at 80° to 200°C, and mixing the adduct thus obtained, in the melt, with a liquid polyamine selected from the group consisting of triethylenetetramine and a polyaminoamide of dimerized fatty acids in the weight ratio of about 100 to 5.50, and β) the curing agent thus obtained is mixed with a cyclic polyglycidyl compound having a softening point of between 40° and 140°C, in a ratio of the quantities such that the ratio of the number of epoxide groups to the number of active H atoms in the curing agent is 1:1.

16. Process according to claim 15, characterised in that a bisphenol-A epoxide resin is employed as the cyclic polyglycidyl compound.

17. Process according to claim 15, characterised in that the cyclic polyglycidyl compound employed is a glycidylated phenol novolac or cresol novolac.

18. Process according to claim 15, characterized in that the cyclic polyglycidyl compound employed is an adduct, containing more than one epoxide group per molecule, said adduct is prepared by reacting a liquid bisphenol A epoxide resin or triglycidylisocyanurate with a terminal dicarboxylic acid polyester of an aliphatic dicarboxylic acid and an aliphatic diol, which has a degree of polymerization of 3 to 20, and the C atoms of the dicarboxylic acid in the polyester, without taking the carboxyl groups into account, being at least 8.

19. Process according to claim 18, characterised in that the cyclic polyglycidyl compound employed is a mixture of adducts of triglycidylisocyanurate and an acid polyester of an aliphatic dicarboxylic acid and an aliphatic diol, which consists predominantly of an adduct containing 4 epoxide groups per molecule.

20. Process according to claim 18, characterised in that an adduct is employed which contains an acid polyester based on sebacic acid and neopentyl glycol.

21. Process according to claim 15, characterized in that the cyclic polyglycidyl compound employed is a mixture of a bisphenol-A epoxide resin and an adduct, containing more than one epoxide group per molecule, said adduct is prepared by reacting triglycidylisocyanurate, a bisphenol-A epoxide resin or a diglycidyltetrahydrobenzimidazolone or -hexahydrobenzimidazolone with a terminal dicarboxylic acid polyester of an aliphatic dicarboxylic acid and an aliphatic diol, which has a degree of polymerization of 3 to 20 with the sum of the C atoms of the diol and the C atoms of the dicarboxylic acid in the polyesters, without taking the carboxyl groups into account, being at least 8.

22. Process according to claim 15, characterized in that the cyclic polyglycidyl compound employed is a mixture of a glycidylated phenol novolac or cresol novolac and an adduct, containing more than one epoxide group per molecule, said adduct is prepared by reacting triglycidylisocyanurate with a terminal dicarboxylic acid polyester of an aliphatic dicarboxylic acid and an aliphatic diol, which has a degree of polymerization of 3 to 20, with the sum of the C atoms of the diol and the C atoms of the dicarboxylic acid in the polyester, without taking the carboxyl groups into account, being at least 8.

23. Process according to claim 15, characterised in that in the manufacture of the adduct for the curing agent 4,4'-diaminodiphenylmethane is employed.

24. Process according to claim 15, characterised in that in the manufacture of the adduct for the curing agent 4,4'-diaminodicyclohexylmethane is employed.

25. Process according to claim 15, characterised in that in the manufacture of the adduct for the curing agent a bisphenol-A epoxide resin is employed.

26. Process according to claim 15, characterised in that in the manufacture of the adduct for the curing agent the epoxide resin employed is a reaction product of epichlorohydrin with an ester of sebacic acid and 3-(2'-hydroxyethyl)-5,5-dimethylhydantoin, with the molar ratio of sebacic acid to 3-(2'-hydroxyethyl)-5,5-dimethylhydantoin in the ester being 1:2.

27. Process according to claim 15, characterised in that the liquid polyamine employed is a polyaminoamide of dimerised fatty acids.

28. Process according to claim 15, characterised in that the liquid polyamine employed is triethylenetetramine.

29. Process according to claim 15, characterised in that the mixing of the curing agent and of the cyclic polyglycidyl compound is effected by conjoint grinding or by simple mixing of both individual constituents, present in the form of powders.

30. Fibre fleeces, fabrics, sheets or films of plastics, glass or the like, preferably of polyethylene terephthalate or polyamide, coated with an epoxide resin composition according to claim 1.

31. A storage stable, solid epoxy resin composition according to claim 1 wherein said adduct consists essentially of the reaction product of an excess of an aromatic or cycloaliphatic amine selected from the group consisting of a 4,4'-diaminodiphenylalkane and a 4,4'-diaminodicyclohexylalkane with a mixture of epoxide resins wherein said adduct has a melting point above 60°C and is prepared at a temperature of 80°C to 200°C.

32. A process for the manufacture of storage-stable, solid 1,2-epoxide resin composition according to claim 15 wherein said adduct consists essentially of the reaction product of an excess of an aromatic or cycloaliphatic amine selected from the group consisting of a 4,4'-diaminodiphenylalkane and a 4,4'-diaminodicyclohexylalkane with a mixture of 1,2-epoxide resins wherein said adduct has a melting point above 60°C and is prepared at a temperature of 80°C to 200°C.

* * * * *